TELEPHONE LINE FINDER

Filed Nov. 1. 1961 2 Sheets-Sheet 1

INVENTOR.
BRUCE D. LUMMIS
BY W. J. Shanley Jr.
ATTORNEY

United States Patent Office 3,193,621
Patented July 6, 1965

3,193,621

TELEPHONE LINE FINDER

Bruce D. Lummis, Webster, N.Y., assignor to General Dynamics Corporation, Rochester, N.Y., a corporation of Delaware Filed Nov. 1, 1961, Ser. No. 149,248
1 Claim. (Cl. 179—18)

This invention relates to a telephone link circuit and, more particularly, to a new and improved line finder circuit.

Line finder circuits perform a plurality of functions in addition to the obvious function of finding a line requiring service. The line finder must be capable of passing over unused or busy lines in the hunting operation and upon the finding of the line requiring service, it forwards a talking path as well as a dial path to the line requiring service. Upon completion of this talking path, the finder then cancels the marking upon the control wire bank indicating that service is required. In addition, the finder circuit must hold the link circuit for the duration of the call.

This has been accomplished in the prior art by placing an off-hook marking potential upon the corresponding wire of a control wire bank. The control of this information is generally accomplished by line relays associated with each line and additional control relays to cancel the off-hook information upon the forwarding of a talking path to the line. Such systems are rendered complex due to the necessity for providing line relays for each line as well as control circuitry for canceling off-hook information from the wire banks.

It is, therefore, an object of my invention to simplify the line finer circuits of a telephone system by dispensing with the necessity for line relays.

It is a further object of my invention to minimize control circuitry for canceling off-hook information from the wire banks in a line finder circuit.

It is a further object of my invention to utilize the audio wire banks for off-hook information and control purposes.

In acordance with my invention, a level detector relay is connected in common to a plurality of lines which are to be hunted in a group. The level detector relay, when operated in response to one of the associated lines going off-hook, initiates the finder action. In accordance with my invention, it is necessary to provide audio isolation between the various lines in the group since the level detector is connected in common to one of the audio conductors of each line. This is accomplished by interposing a diode between each line and the common connected level detector relay. These diodes are poled to be conductive when the associated line goes off-hook. Upon conduction of a diode, an off-hook marking potential is placed upon an associated control wire bank and the finder starts to hunt for the line in the group containing the off-hook marking potential. Upon finding this potential, the audio path is extended and in response thereto a back bias is placed upon the diode associated with the off-hook line thus deenergizing the level detector and in addition the back biasing serves to provide the required audio isolation. A holding circuit is also established for maintaining the extended audio path as long as battery current is being supplied to the audio path.

Figure 1A:
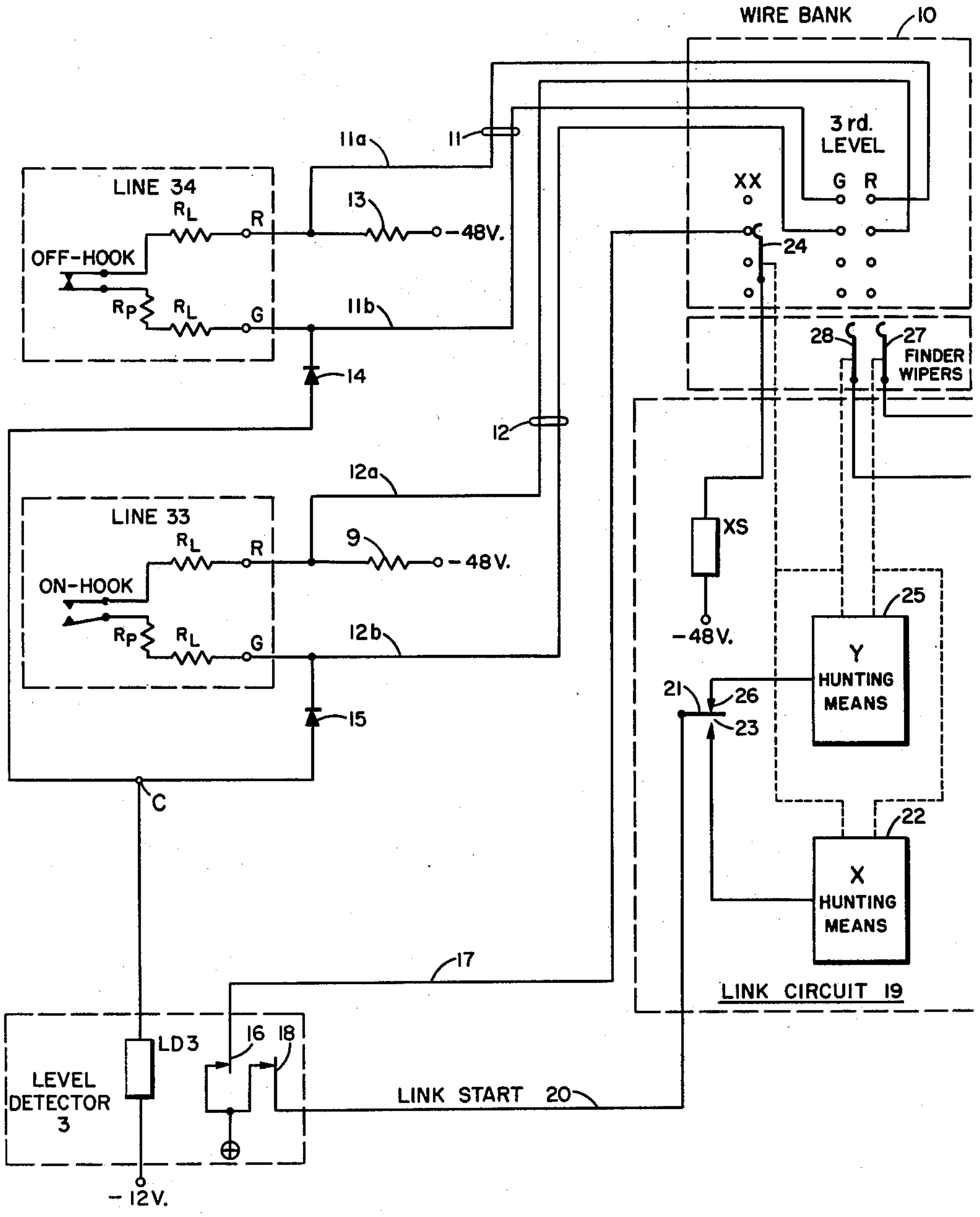
Figures 1B, 2:
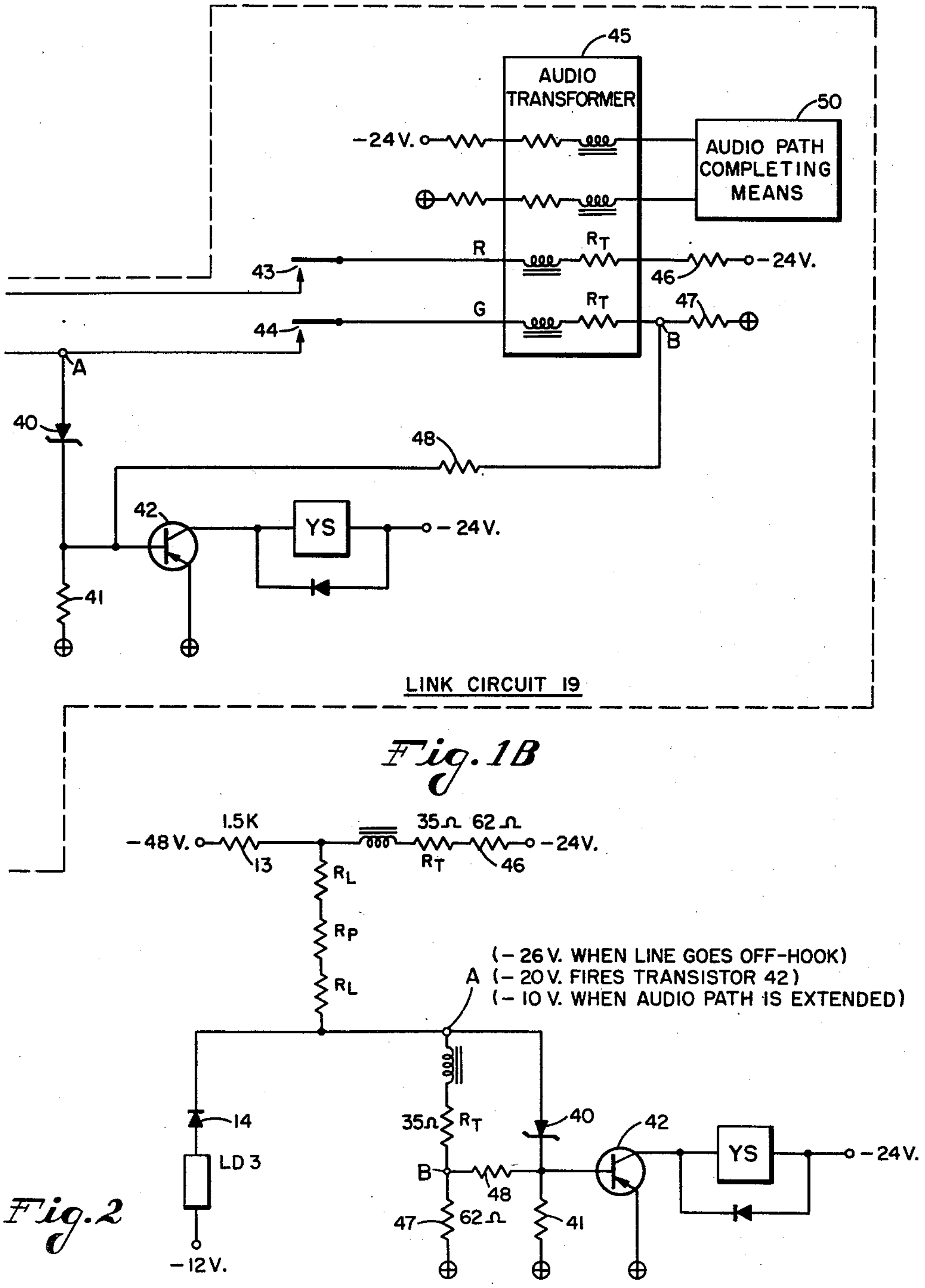

Other features and objects of my invention will become apparent as this description proceeds with reference to FIGS. 1A and 1B, which is a schematic diagram of the system of my invention.

FIG. 2 is a schematic diagram of selected portions of the system of my invention to aid in an understanding of my invention.

Referring now to FIGS. 1A and 1B, my invention will be described with reference to the well known XY two-directional universal switch. For purposes of illustration, only two lines, i.e., lines 33 and 34, have been illustrated. These lines are associated with the third level of the wire bank 10. Lines 33 and 34 are connected to the third and fourth audio wires, in the third level of bank 10 by conductors 12 and 11, respectively. The R wire of each of the third and fourth audio wire pairs is connected to a −48 volt source of potential over conductors **11*a* and 12*a* through battery feed resistors 13 and 9, respectively. The second wire (G) of each of the audio wire pairs associated with lines 34 and 33 is connected to common point C via conductors 11*b* and 12*b* and diodes 14 and 15, respectively. Common point C is then connected to a second source of potential (−12 volts) through level detector 3. It will be noted that diodes 14 and 15 are poled in a direction to be conducting whenever the associated line goes off hook thus energizing relay LD3. Relay LD3 operates and forwards a ground via contacts 16 and conductor 17 to the third wire in the XX bank, and also a LINK START ground to link circuit 19 via contacts 18 and conductor 20. The LINK START ground applied to link circuit 19 is applied to X HUNTING MEANS 22 via contacts 21 and 23 of non-operated X stop relay XS. X HUNTING MEANS 22 is self-interrupting and when energized by the LINK START ground drives wiper 24 from its home position into the XX bank. When wiper 24 finds the ground on the third wire of the XX bank, X stop relay XS operates deenergizing X HUNTING MEANS 22 and completing the energizing circuit for Y HUNTING MEANS 25 via operated contacts 21 and 26** of the XS relay.

As is well known, during the hunting of the XX bank, wipers 27 and 28 are stepping in synchronism in the X direction. Thus, upon the operation of XS relay, wipers 27 and 28 are at the third level ready to be stepped in a Y direction upon the energization of Y HUNTING MEANS 25. Y HUNTING MEANS 25 like X HUNTING MEANS 22 is self-interrupting to automatically step wipers 27 and 28 into the third level until wipers 27 and 28 finds the line in this level requiring service.

When line 34 goes off-hook, as illustrated, current flows from a −12 volt source through LD3, diode 14, the loop of line 34 and battery feed resistor 13 to the −48 volt source of potential. The magnitude of the current flowing in this path will, of course, depend upon the resistance of the path. In the preferred embodiment of my invention, the following values of resistance were assigned to the illustrated components.

$R_L$=0–200Ω
$R_P$=30–50Ω
$R_{LD3}$=1.2K
14 and 15=100Ω(forward resistance)
9 and 13=1.5K Thus, conductor **11*b* and consequently wire G of the audio wire pair associated with line 34 are at a potential of between −24 and −28 volts. Thus when wiper 28 steps to the fourth wire of the audio bank, point A will then assume this potential. Zener diode 40 and resistor 41, which are series-connected between point A and ground, provide means for detecting the −24 to −28 volt off-hook information contained on the G wires of the audio wire pairs. Zener diode 40 breaks down when the potential at point A exceeds −20 volts thus turning transistor 42** on to operate Y stop relay YS.

Upon operation of Y stop relay YS, the audio path is extended from wipers 27 and 28 via operated contacts 43 and 44 to audio transformer 45. Battery current is applied to the extended audio path over resistors 46 and 47 which are, respectively, connected to −24 volts and positive ground.

Upon extension of the audio path to transformer 45, battery current flows through the extended audio path due to the connection of the —24 volt source of potential.

Referring now to FIG. 2, since resistor 46 is relatively small with respect to the value of resistance 13, for example in the preferred embodiment of my invention, resistors 46 and 47 are 62 ohms. The potential at point A will be primarily determined by the —24 volt source of potential. In response to the extension of the audio path through contacts 43 and 44, point A assumes a potential of —10 volts thus placing a 2 volt back bias on diode 14. Relay LD3 is thus deenergized to remove the level marking potential from wire 3 of the XX bank. Thus, the "service-required" or "off-hook" information is removed from the XX bank. In addition, since point A is now at —10 volts, the G wire associated with line 34 is marked busy so that later hunting of the third level of the audio wire bank will not operate the YS relay of a finder hunting in the third level. The direct connection to the base of transistor 42 through resistance 48 to point B on the extended audio path provides means for maintaining transistor 42 in its conducting condition to maintain the YS relay in its operated condition to thus maintain the extended audio path. Thus, the audio path will remain extended as long as battery current is flowing in the extended audio path. Upon line 34 going on-hook, transistor 42 will be denergizing thus dropping out the YS relay.

Audio transformer 45 provides means for coupling the extended audio path to AUDIO PATH COMPLETING MEANS 50 which provides means for connecting the extended audio path of a calling line to the called line in accordance with well known techniques utilized in an XY telephone system.

The dialing circuit has not been illustrated since it is not felt to be necessary for an adequate understanding of my invention. However, it will be recognized that the dialing circuit is completed over a third wire (not shown) associated with each line through an additional wiper on the two-directional finder switch to establish a dialing path from the calling line to the associated connector or selector.

While I have shown and described a specific embodiment of my invention, other modifications will readily occur to those skilled in the art. I do not, therefore, desire my invention to be limited to the specific arrangement shown and described, and I intend in the appended claim to cover all modifications within the spirit and scope of my invention.

What is claimed is:

In a telephone system comprising a plurality of separate two-conductor lines each of which has an off-hook condition and an on-hook condition, a loop circuit between the two conductors of each of said lines being produced only in response to that line having its off-hook condition, and individual first resistance means connecting a first conductor of each of said lines to a first point of fixed potential; a line finder circuit therefor comprising first and second audio conductors, hunting means including a switch effective when energized for simultaneously connecting said first and second audio conductors respectively to the first and second conductors of each of said plurality of lines in sequence, an off-hook detector having one end thereof connected to a second point of fixed potential, an energizing circuit for said detector including individual unilateral conducting devices each of which connects the second conductor of a different one of said lines to the other end of said detector, said first point of fixed potential having a polarity and magnitude with respect to said second point of fixed potential to forward bias any one of said devices and to produce a potential of a first given magnitude on the second conductor of a line connected to said one of said devices in response to that line having an off-hook condition, whereby said detector is energized in response to an off-hook condition of any of said lines, means coupled between said detector and in said hunting means for energizing said hunting means in response to the energization of said detector, normally open switchthrough means connected to said first and second audio conductors for extending a connection in response to the closure thereof, potential-responsive means coupling said second audio conductor to said switchthrough means for effecting the closure thereof in response to said second audio conductor having a potential thereon of at least a second given magnitude, said first given magnitude being at least equal to said second given magnitude, second resistance means for connecting a third point of fixed potential to said second audio conductor in response to the closure of said switchthrough means to produce a potential thereon having a third given magnitude which is less than said second given magnitude and which has a polarity with respect to said second point of fixed potential to back bias said devices to thereby de-energize said detector and said hunting means, and means responsive to current flowing through said second resistance means for maintaining said switchthrough means closed as long as said off-hook condition prevails.

References Cited by the Examiner

UNITED STATES PATENTS

| | | | |
|---|---|---|---|
| 1,903,837 | 4/33 | Richardson | 179—18 |
| 2,697,750 | 12/54 | Buchner et al. | 179—18 |
| 2,699,467 | 1/55 | Faulkner | 179—18 |

ROBERT H. ROSE, *Primary Examiner.*

WILLIAM C. COOPER, *Examiner.*